the
US009372070B1

(12) United States Patent
Jancic et al.

(10) Patent No.: US 9,372,070 B1
(45) Date of Patent: Jun. 21, 2016

(54) TARGET LOCATING DEVICE AND METHODS

(71) Applicant: L-3 Communications Corporation, Warrior Systems Division, Londonderry, NH (US)

(72) Inventors: Dale Jancic, Bedford, NH (US); Christopher Rakowski, Somerville, MA (US); Donald Spencer, Merrimack, MA (US)

(73) Assignee: L-3 COMMUNICATIONS CORPORATION, Londonderry, NH (US)

( * ) Notice: Subject to any disclaimer, the term of this patent is extended or adjusted under 35 U.S.C. 154(b) by 539 days.

(21) Appl. No.: 13/833,030

(22) Filed: Mar. 15, 2013

Related U.S. Application Data

(60) Provisional application No. 61/672,642, filed on Jul. 17, 2012.

(51) Int. Cl.
*G06K 9/00* (2006.01)
*G01B 11/02* (2006.01)
*G06T 7/00* (2006.01)
*G01C 3/06* (2006.01)

(52) U.S. Cl.
CPC ............... *G01B 11/026* (2013.01); *G01C 3/06* (2013.01); *G06T 7/0065* (2013.01); *G06T 2207/10016* (2013.01); *G06T 2207/30212* (2013.01)

(58) Field of Classification Search
CPC ............... G01B 11/026; G06T 7/0065; G06T 2207/30212; G06T 2207/10016; G01C 3/06
See application file for complete search history.

(56) References Cited

U.S. PATENT DOCUMENTS

| 8,400,619 B1* | 3/2013 | Bachrach et al. ............ 356/4.01 |
| 2005/0057745 A1* | 3/2005 | Bontje ..................... 356/139.03 |

* cited by examiner

*Primary Examiner* — Tom Y Lu
(74) *Attorney, Agent, or Firm* — Grossman, Tucker, Perreault & Pfleger, PLLC

(57) ABSTRACT

A target location device has a video camera, a range finder, a self location module and an inertial measurement unit. The device provides a video display including video output of the camera and an object marker such as a cross-hair overlayed on the video output for aiming the camera on a reference point or on a target in the video output. The range finder determines a distance from the device to the target. The self location module identifies the geographic location of the device. The inertial measurement unit includes at least one gyro for providing outputs corresponding to the location of the reference point and the target. Video stabilization may be use to allow accurate placement of the object marker on the target or reference point. Automatic range finder firing and gyroscope error compensation are also provided.

18 Claims, 13 Drawing Sheets

FIG 12

TARGET LOCATING DEVICE AND METHODS

CROSS-REFERENCE TO RELATED APPLICATIONS

The present application claims the benefit of U.S. provisional patent application Ser. No. 61/672,642, filed Jul. 17, 2012, which is fully incorporated herein by reference.

TECHNICAL FIELD

The present application relates to a locating device and methods and, more particularly, to a target locating device and related methods for establishing the location of a target of interest.

BACKGROUND

Devices for determining the general location of an enemy target in a combative situation are known. Of course, the ability to precisely locate a target to 15 meters CEP (Circular Error of Probability) is important, especially when the information may be used to destroy an enemy target. An operator on the ground or in an aircraft may be able to see, identify and precisely locate an enemy target up to several miles away. The operator may desire to exchange the geographic location of the target with a ground or air-based system, such as an artillery or an aircraft with a GPS guided missile.

Known location devices include devices using an inertial measurement unit (IMU) that may contain one or more gyroscopes (hereinafter gyros) for ascertaining the roll, pitch and/or yaw of a target relative to a known reference point. A drawback to gyroscopes is that they may initially be accurate, but the amount of inaccuracy/error increases with time and environmental conditions such as temperature. This change in error can start in less than one (1) second from power-up of the IMU. This change in error becomes important when a reference point is used to help locate a new target. If the rate of change of the error of the gyros is not compensated for, the time it takes to sight the reference point and the new target can cause an error in the location of the new target by greater than one (1) mil. A mil is a radial measurement that equals one (1) meter at a distance of 1000 meters.

Video cameras can be used to view objects at a distance and may be implemented with zoom functionality. The jitter of the human hand or other elements coupled to the video camera, e.g. a tripod, can cause a blurred image when the video camera is zoomed in on a distant object. To address blurring caused by jitter, this image can be stabilized according to a variety of known methods. In one video stabilization method, the video in the view finder is stabilized by shifting the image received in the view finder based on inputs received from two or more gyros. The gyroscopes sense the amount of jitter in the X and Y directions and communicate it to a video processor which can shift the received image in the view finder.

BRIEF DESCRIPTION OF THE DRAWINGS

Reference should be made to the following detailed description which should be read in conjunction with the following figures, wherein like numerals represent like parts:

FIG. 12 is a photo of the moon viewed through the location device consistent with the present disclosure.

DETAILED DESCRIPTION

Figure 1:
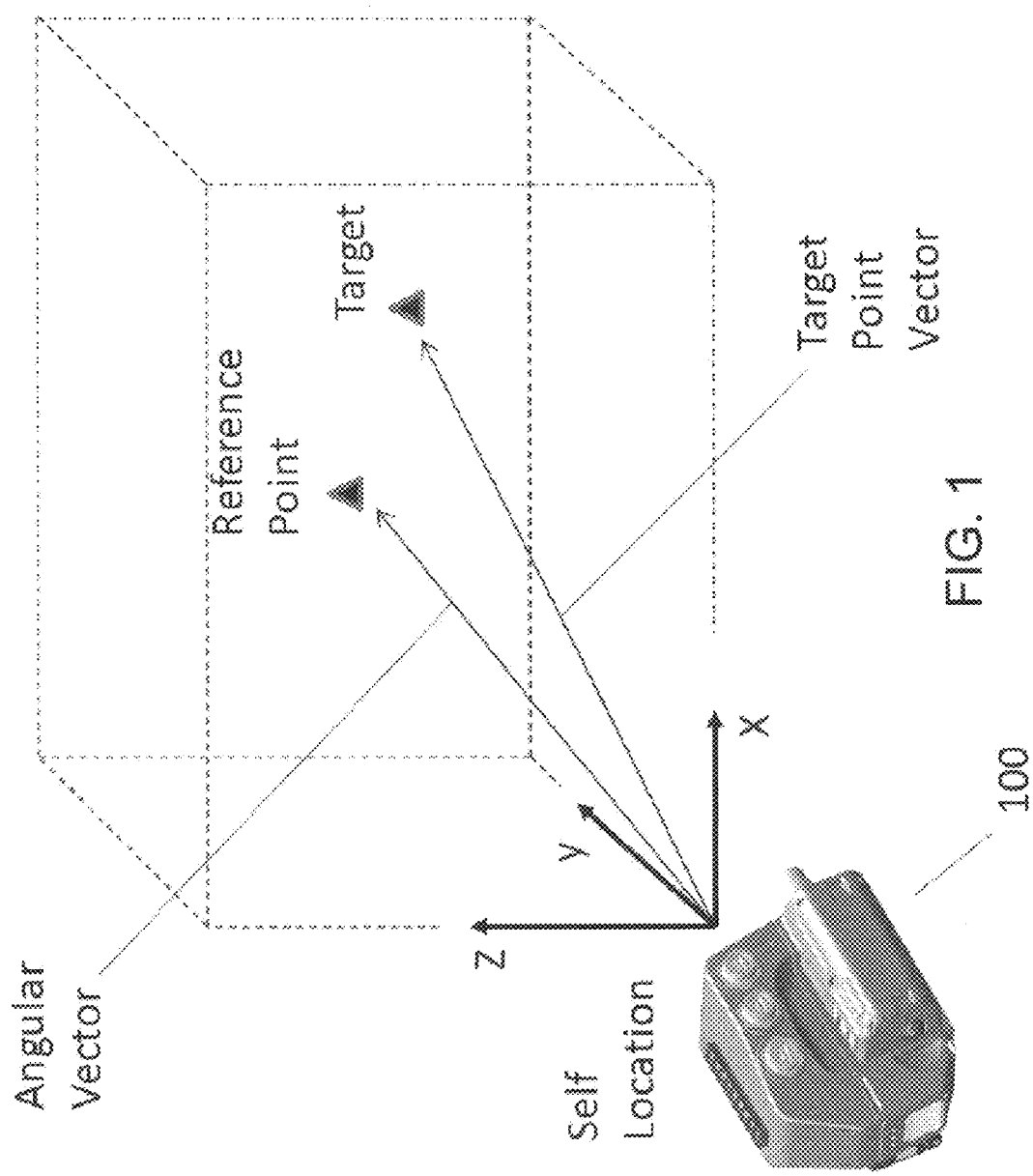
FIG. 1 is graphical illustration of a coordinate system useful in describing a location device consistent with the present disclosure.

Applicants believe three major criteria should be adhered to in the design of a device to provide the dismounted operator with the ability to precisely and accurately locate a target in the real world operating environments:

1. Since there is no single precision azimuth finding solution that functions 100% of the time on the battlefield; the system should provide multiple solutions.
2. Since the system must be operationally safe, suitable, and effective on the battlefield under dynamic conditions; the system should be small, lightweight, and able to be put into action quickly without the use of a tripod.
3. Since accurate and precise target location cannot be achieved with a federated system; the direction finding functions should be fully integrated with imaging and ranging functions.

To satisfy these criteria the device should incorporate all five known means that can provide a azimuth and elevation to a geospatially referenced target Magnetic: Sensing Earth's magnetic field is the oldest and most utilized method for direction finding done today. This mature technology is small and lightweight, low in cost and power. However, disturbances by local magnetic fields and continuous variations in the Earth's magnetic field distort measurements (and cannot always be calibrated out in real-time) making this technology unsuitable for precision work. The Digital Magnetic Compass (DMC) does have its place when general direction is required in a short period of time (seconds) and for aiding more precise forms of direction finding such as celestial.

Terrestrial: Terrestrial navigation has been a long-established means for determining self-location and location of distant points using fixed visual landmarks and features. Given the dramatic increase in accuracy and availability of electronic and satellite imagery, a very high degree of target location accuracy can be achieved. A disadvantage of terrestrial is that it requires that geographic reference points be available to the operator.

Celestial: Celestial navigation has been used over the centuries and today celestial bodies (stars, sun, moon and planets) have been tracked, mapped and documented to an extremely high degree of accuracy. The one requirement is the need for a clear sky. Previously developed celestial compasses include a camera with a wide angle lens suitable for viewing a large portion of the sky. This specific solution is not always operationally suitable because only small areas of clear sky are available due to cloud cover and the Operator's view of the night sky is usually limited by physical obstructions.

Inertial Sensors: Inertial navigation is used to detect a change in geographic position (a move east or north), a change in orientation (rotation about an axis) and a change in velocity (speed and direction of movement), in which measurements are provided by accelerometers and gyroscopes. When 'strapped down' to the Earth, the gyrocompass can find north. The obvious advantage of the gyrocompass (aka: north seeking gyro) is that it is fully self contained. The largest disadvantage is it is only functional as long as it is strapped down. Once moved or disturbed, the gyrocompass no longer provides north seeking. The second major disadvantage is the time required to find north, which under optimum conditions, is 2-3 minutes.

Differential GPS: Differential GPS uses triangulation using existing GPS signals and multiple GPS receivers with spatially separated antennas to obtain an azimuth bearing. Some of the disadvantage is the (1) vulnerability to multipath and jamming, (2) long signal acquisition time periods (minutes), and (3) Geometric Dilution of Precision (GDOP) due to multiplicative effect of GPS satellite geometry on GPS precision.

The devices theory of operation may be to transpose angular vector a known Reference Point (RP) to an unknown point (the target) and provide a target point vector with precise angular accuracy (see FIG. 1). When target range is included, the target location is now known. An RP can be magnetic, terrestrial, celestial, or north finding direction or differential GPS vector. To achieve this in a handheld system (no tripod), the fusion of IMU information, imagery and target range is performed and presented to the Operator in real time. What the Operator now has is an Augmented Reality (AR) system where the live view of a physical, real-world environment is augmented by computer-generated graphics. Specifically, motion due to hand shaking is removed from both the image and geospatial reference graphics with real time stabilization, targeting cursors are placed at the desired point by moving the system, and the rangefinder fires by passing the cursor across the target.

A location device 100 (hereinafter "device 100") consistent with the present disclosure includes video camera, an inertial measurement unit (IMU) and a range finder integrated into a single system to allow an operator to identify the location of a target with high precision. In general, the geographic location of the device 100 itself may be determined using a global positioning system (GPS) receiver integrated into the device 100 or in a separate enclosure. An operator may pan the camera across a field of view to locate a known reference point in the camera display. The reference point may have a known geographic location. Since the location of the device 100 and the reference point are known, a heading is established. The device 100 may be operated to determine true "North" based on the established heading and output(s) from the IMU. The reference point may be displayed on the video output of the camera by providing a reference point marker overlay, for example in a diamond shape. After the reference point is located and marked, the user may pan the device 100 to locate a target in the camera display and range to the target. The device 100 may determine a first estimate of a geographic location of the target from the calculated range to the target, the known location of the device 100, and the change in the output IMU from the established heading, and may mark the target using a target marker overlay on the video output. The heading for the target may also be displayed on the video output. This first target location may have error caused for example by gyro drift.

Applicants have discovered that the drift caused by a gyro can affect the accuracy of the device 100. A more precise target location may be determined with the location device 100 consistent with the present disclosure through correction for errors in the gyros within the IMU and/or through use of image stabilization for identifying and marking the known reference point(s) and/or the target on the camera display. A more accurate estimate of the location of the target may be calculated by panning the device 100 back towards the known reference point, realigning the device 100 with the reference point, recapturing the IMU output(s), determining the change in the IMU outputs since the device 100 was first pointed at the reference point (which is mostly from gyro shift over time), estimating the amount of gyro error at the time the target was located, and subtracting out the gyro error. The device 100 may be configured to automatically rezero the gyro(s) when the device 100 is aligned with the reference point. Although reference is made to a single reference point, multiple references points may be used. These reference points may be man-made objects like buildings, geographic features such as a mountain peak, or the location of the sun, moon, a planet, a star or other terrestrial object.

Image stabilization of the video image on the camera display allows for precise alignment of a reticle/cross-hair on the camera display on the known reference point and the target. The range finder may be factory aligned with the optical axis of the camera, however, when image stabilization is used, the reticle/cross-hair displayed in the camera display may no longer be aligned with the optical axis of the camera and the rangefinder. If the rangefinder were to range when the image is stabilized, the range pulse may miss the reference point or target and the device 100 may acquire an incorrect range. As described below, one exemplary embodiment compensates for this "misalignment."

Figure 2A:
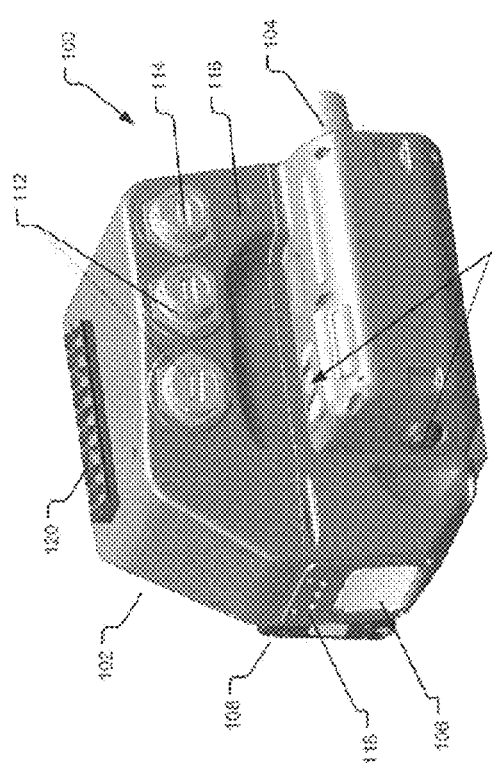
FIG. 2A is a perspective view of a location device 100 consistent with the present disclosure and FIG. 2B is another perspective view of the location device 100.
Figure 2B:
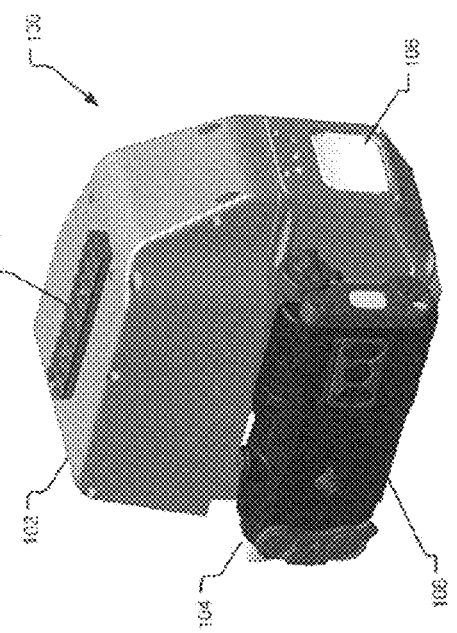

Turning now to FIGS. 1 and 2, there is illustrated one exemplary embodiment 100 of a location device 100 consistent with the present disclosure. The device 100 generally includes a main housing 102 with a video camera, IMU, GPS and control electronics and interfaces (illustrated in FIG. 3) disposed therein. A camera lens 104 is provided at one end of the device 100 and a display 106 for viewing by an operator is provided at an opposite end of the device 100. A range finder 108 may be coupled to the housing 102 and may be controlled by the control electronics. The range finder 108 may be aligned with an optical axis of the camera.

User interface switches or buttons 110 may be provided on the housing for allowing a user to scroll through and select menu options on the display 106, to mark a reference point and target, etc. In the illustrated embodiment, the device 100 also includes universal serial bus (USB) ports 112 for installing programming and/or firmware updates to the control electronics and an ethernet port 114 for connecting the device 100 to a network. A power switch 116 may be provided on the housing 102 for turning the device 100 On and Off. Status light emitting diodes (LEDs) 118 may be provided adjacent the display 106 for indicating the "on", "off" or "low battery" status of the device 100.

The device 100 may be a hand-held, portable device 100 that may be operated by a single operator. In addition or alternatively, the device 100 may be configured for mounting to a platform location such a tripod or vehicle. A rail mount 120, such as a known Picatinny rail, may be coupled to the housing 102 for mounting other systems or devices.

Figure 3:
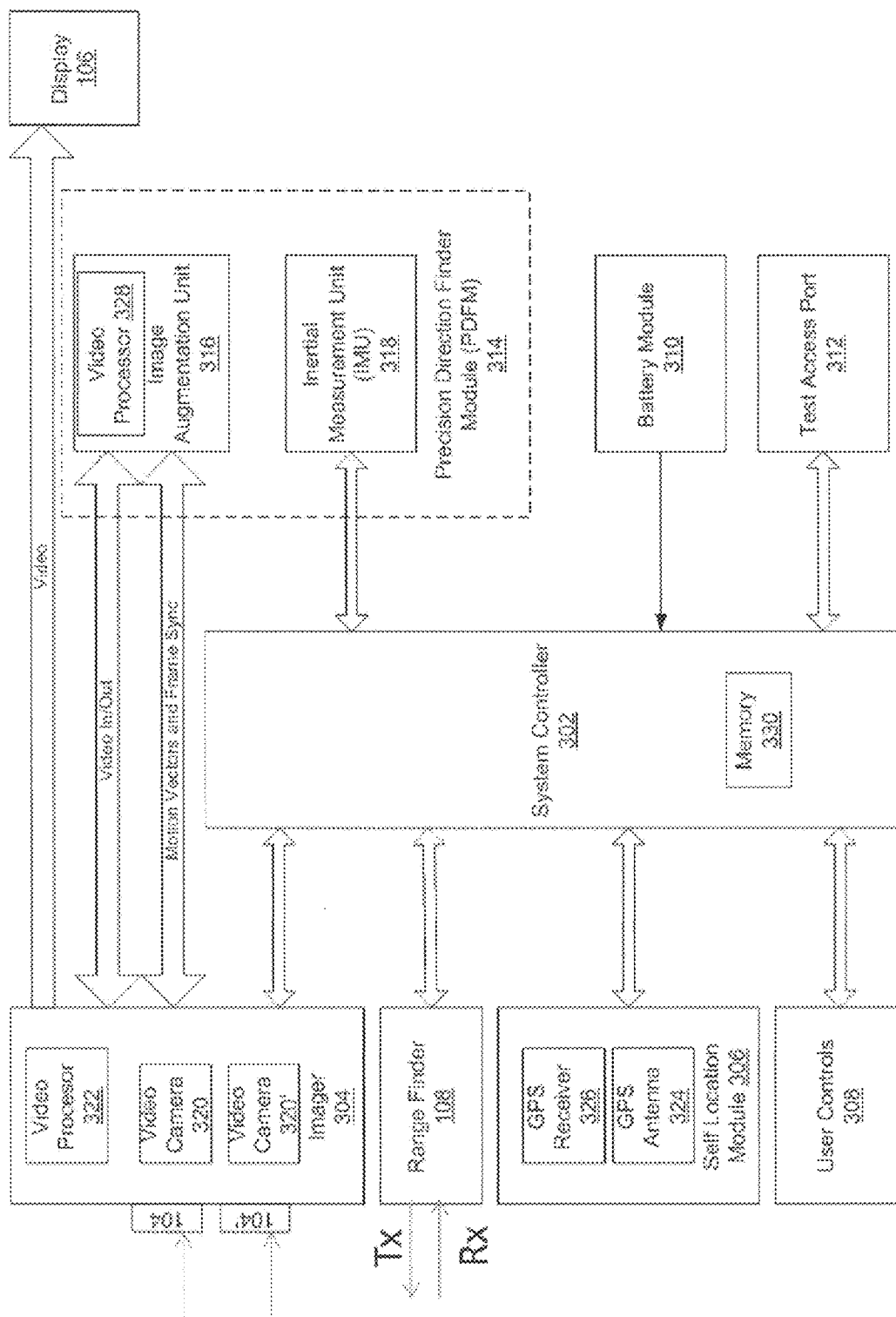
FIG. 3 is functional block diagram of one exemplary embodiment of a location device consistent with the present disclosure.

FIG. 3 is a functional block diagram of location device 100 consistent with the present disclosure. As shown, the device 100 may include system controller 302, an imager 304, the display 106, the range finder 108, a self location module 306, user controls 308, a battery module 310 and a test access port 312. The device 100 also includes a precision direction finder module (PDFM) 314 including an image augmentation unit 316 and an inertial measurement unit (IMU) 318. As will be described in greater detail below, the system controller 302 calculates the geographic location of a target from the outputs of the self location module 306, the range finder 108, and the IMU 318. The imager 304, the image augmentation unit 316 and the display 106 assist the user in locating known reference points and targets. The user controls 308 assist the user in manipulating device 100 functions and the test access port 312 allows for testing and update of device operation.

The system controller 302 may include a known microcontroller having an internal computer readable memory 330 and configured to provide, for example, overall system control, system-wide time synchronization, user-interface control, power management, range finder 108 control, user configuration capability, image storage, and an external memory interface. The imager 304 may be under the control of the system controller 302 and may include a known video camera 320, camera lens 104, and a video processor 322 for applying image stabilization to the video output of the camera 320. The video processor 322 may include a symbology generator for overlaying target markers, reference markers, user selectable menu items, and location data on the video output of the camera 320. The camera 320 may operate in the visible, infrared spectrum, or both. One or more optically aligned cameras 320, 320' may be used. The video output of the imager 304 is provided to the display 106, which may take a known configuration. In one embodiment, for example, the display 106 may be a color microdisplay with a SXGA format.

The range finder 108 and self location module 306 may be under control of the system controller 302. The range finder 108 may be a known high accuracy laser range finder with a range suited to the application. The self location module 306 may include a known GPS antenna 324 and a known GPS receiver 326 with an interface to the controller 302.

The user controls 308 may include user interface switches 110, which may be configured as known push button switches, rotary mode switches, 5-way navigation switches, etc. The user controls 308 may also include a battery release latch, a GPS support connector and auxiliary connections. The test access port 312 may include connections for system access, debugging and calibration. The connections may include, for example, a logic analyzer port, a video connector and connection for making software and firmware updates.

The image augmentation unit (IAU) 316 in the PDFM 314 may include a known video processor 328 configured to provide video-based motion-estimation data to the video processor 322 in the imager 304 for performing image stabilization to facilitate reference point and target marking. The video processor 328 in the image augmentation unit 316 may also provide motion vectors to the IMU 318 for calculation of overlay placement. The overlays may be returned to the video processor 328 from the IMU 318 for placement relative to the output of the video camera 320. The image augmentation unit 316 may perform image motion and overlay. When the user selects a reference point (RP), the IAU may save the image in memory. From that point on, whenever the saved image is in the field of view, the IAU may calculate how much motion there has been between the original scene and the new scene. If the gyros had no drift, this motion would always agree with the gyro motion and no correction would have to be made. However, because of gyro drift, the gyros and IAU will disagree on the motion. In the location device 100, the gyros are reset to agree with the image motion, and apply the measured error over time as a rate to future gyro motion to compensate for drift. In another embodiment, the image used for comparison may not necessarily need to be on the RP, and may be done on the fly as video streams by rather than on any particular image. The location device 100 also has the ability to send the IAU messages for icons (crosshairs, number displays, and diamonds to mark objects) and it locates them on top of the video for the user to see. The PDFM makes the choices of icons and calculations for their positions to match up with the world.

In one embodiment, for example, the video processor 328 in the image augmentation unit 316 may be an Acadia II processor presently available from SRI International Corporation of Princeton, N.J. The IMU portion 318 of the PDFM 314 may include known accelerometers, gyroscopes, and magnetometers. The IMU 318 may collect and process gyroscope, accelerometer, magnetometer, GPS and video-based motion estimation data to provide azimuth, elevation, bank and GPS coordinates to the system controller 302 for calculating the location of the target.

Figure 4:
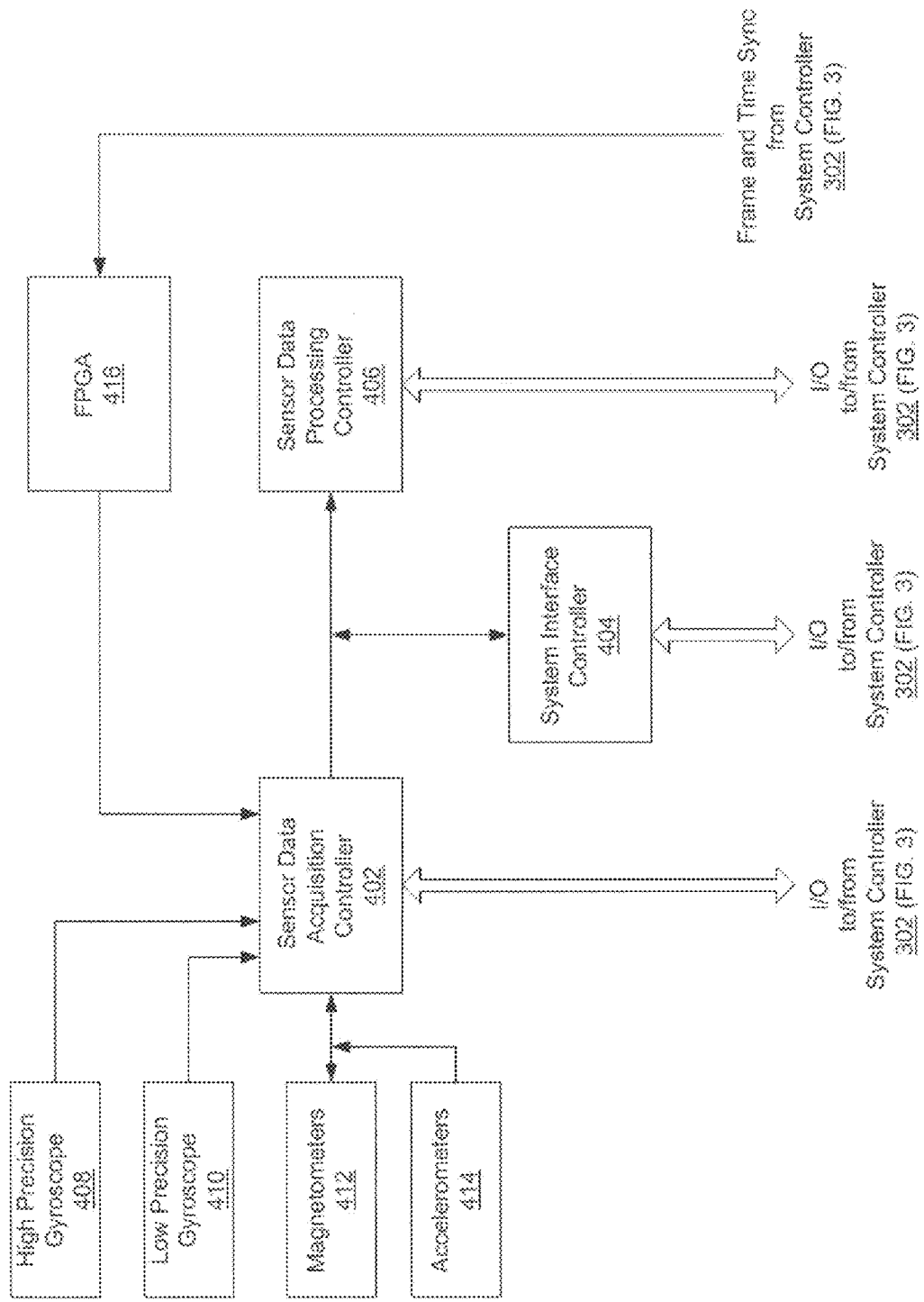
FIG. 4 is a block diagram of an exemplary embodiment of an inertial measurement unit consistent with the present disclosure.

FIG. 4 is a functional block diagram of an IMU 318 useful in a system consistent with the present disclosure. In the illustrated embodiment, the IMU 318 includes a sensor data acquisition controller 402, a system interface controller 404, a sensor data processing controller 406, a high precision gyroscope 408, a low precision gyroscope 410, one or more magnetometers 412, one or more accelerometers 414 and a field programmable gate array (FPGA) 416.

With continued reference to both FIG. 3 and FIG. 4, the sensor data acquisition controller 402 may collect data from the gyroscopes 408, 410, magnetometers 412 and accelerometers 414, along with GPS data from the GPS receiver 326 in self location module 306 and motion estimate data from the image augmentation unit 316. The FPGA 416 may receive video frame and system time synchronization data from the system controller 302 and provide corresponding system time and frame synchronization data to the sensor data acquisition controller 402. The data collected by the sensor data acquisition controller 402 may be processed in the sensor data processing controller 406 to provide roll, pitch and yaw data to the system controller 302 through the system interface controller 404. The sensor data processing controller 406 may also receive motion estimate vectors from the video processor 328 in the image augmentation unit 316 and calculate graphical overlay information. The graphical overlay information allows graphical overlays, e.g. target and reference point markers and overlays representing roll, pitch and/or yaw data, to be placed on the video output of the camera at the correct location. The system interface controller 404 manages exchange of data input/output (I/O) to and from the parent system. Each of the controllers 402, 404, 406 may also be coupled to the test access port 312 for allowing testing and updating of the IMU 318 components.

The controllers 402, 404, 406 may be known microcontrollers with internal or external memory. In one embodiment, for example, each of the controllers 402, 404, 406 may be an AVR32 microcontroller presently available from Atmel Corporation of San Jose, Calif. The data connection between the controllers 402, 404, 406 may be configured as a controller area network (CAN) bus. The I/O of the controller may be coupled to the system controller through a common connector.

The high precision gyroscope 408 and low precision gyroscope 410 may be known 3-axis gyroscope configurations with the high precision gyroscope 408 requiring higher power and providing increased accuracy compared to the low precision gyroscope 410. In some embodiments, the outputs of the low precision gyroscope 410 may be used to calculate position information during image stabilization operation and the outputs of the high precision gyroscope 408 may be used to calculate position information during periods when image stabilization is not activated. The magnetometers 412 and accelerometers 414 may be known magnetometer and accelerometer configurations. An accelerometer may be aligned with each axis of the gyroscopes 408, 410 for providing information regarding movement of the device 100.

In general, the geographic location of a target is calculated in the controller 302 by determining the location of the device 100, determining the location of a known reference point relative to the device 100, and then determining the location of the target relative to the location of the known reference point. The location of the device 100 may be determined by the GPS receiver 326 in the self location module 306. The camera 320 may then be panned to a known reference point and the location of the reference point relative to the location of the device 100 may be determined from the output of the IMU 318 and the range finder 108. When the camera 320 is panned to the target, the location of the target may be determined from the output of the IMU 318 and the range finder 108 and the location of the known reference point relative to the location of the device 100.

Figure 5:
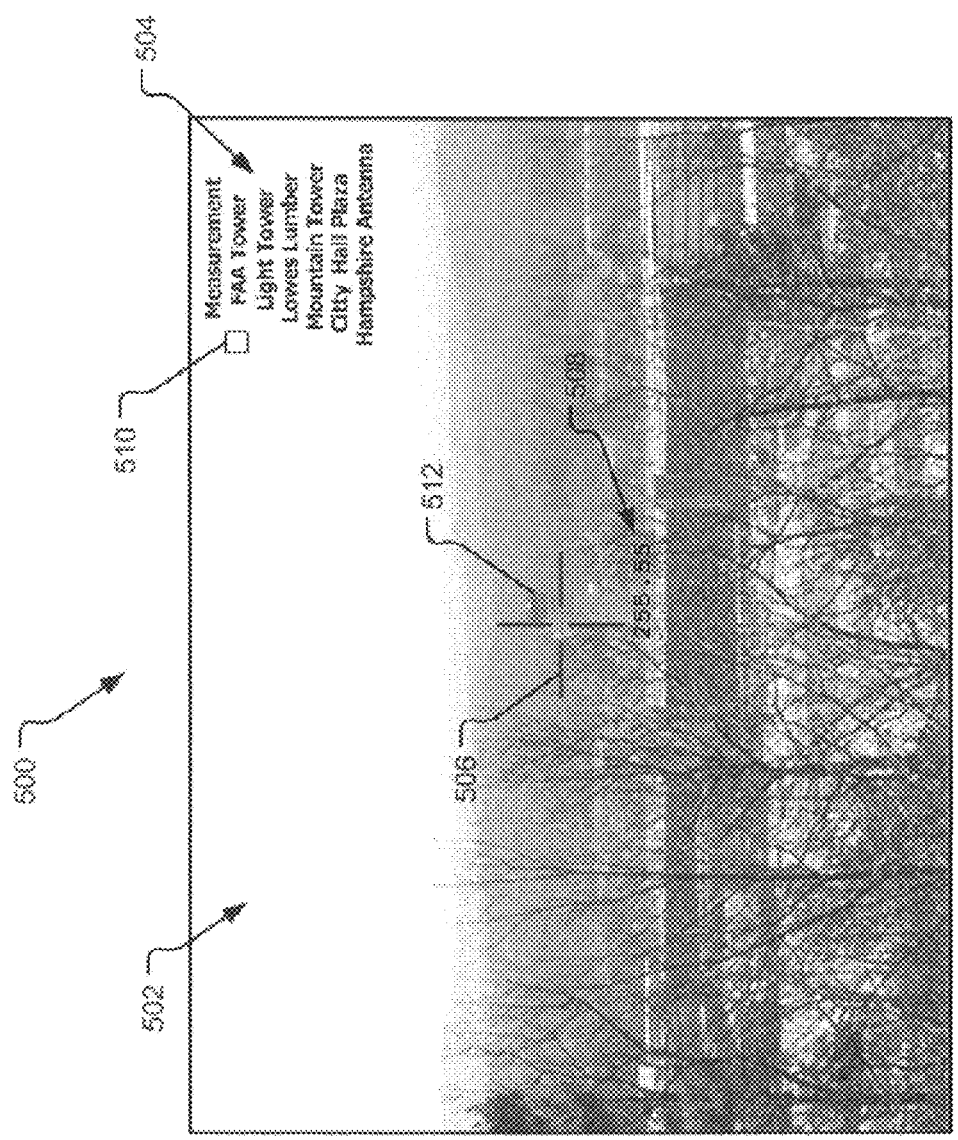
FIG. 5 is a screen shot from a display of a location device consistent with the present disclosure.

FIG. 5 is a screen shot 500 from a display 106 of the device 100 consistent with the present disclosure. With continued reference also to FIG. 3, in the illustrated embodiment the display 106 shows the video output 502 of the camera 320 field of view. Overlayed on top of the video output 502 is a list of known reference points 504, an object marker, such as cross-hair 506, for aiming the optical axis of the camera on a selected item in the field of view, and a yaw angle output 508 from the IMU 318. The cross-hair 506 and reference point 504 overlays may be provided by the system controller 302 and overlayed onto the video by the video processor 322 in the imager 304. The cross-hair 506 may be aligned with the optical axis of the camera 320. The optical axis of the range finder 108 may also be aligned with the optical axis of the camera 320.

The reference points in the list of reference points 504 may be locations having known GPS coordinates determined by a survey or previously acquired by the device 100 and stored in the memory 330 of the system controller 302. A user may operate the user controls 308 to scroll through and select one of the reference points from the list of reference points 504. In the illustrated embodiment, the "FAA Tower" reference point 512 has been selected by the user as indicated by the square 510 adjacent thereto, and the cross-hair 506 is positioned near the "FAA Tower" reference point 512 in the camera field of view. When a reference point, e.g. the FAA Tower reference point 512, is selected by a user, the associated GPS location of the reference point is selected by the system controller 302 as the GPS location of the reference point 512 to be used for target location calculations.

For ease of explanation, the discussion that follows will refer to the reference point as being the "FAA Tower" reference point 512. It is to be understood, however, that any reference point may be selected from the list of reference points.

Figure 6:
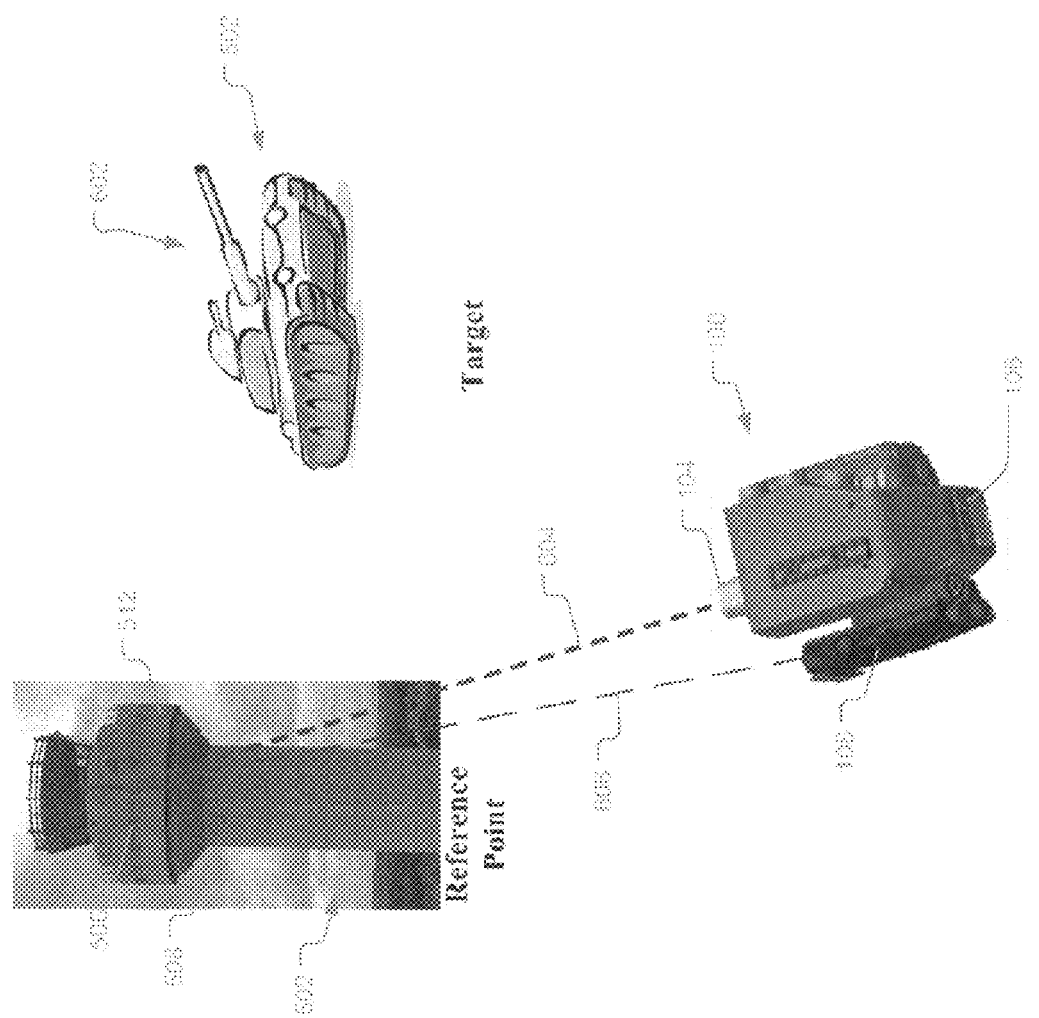
FIGS. 6-8 schematically illustrate operation of a location device consistent with the present disclosure.
Figure 7:
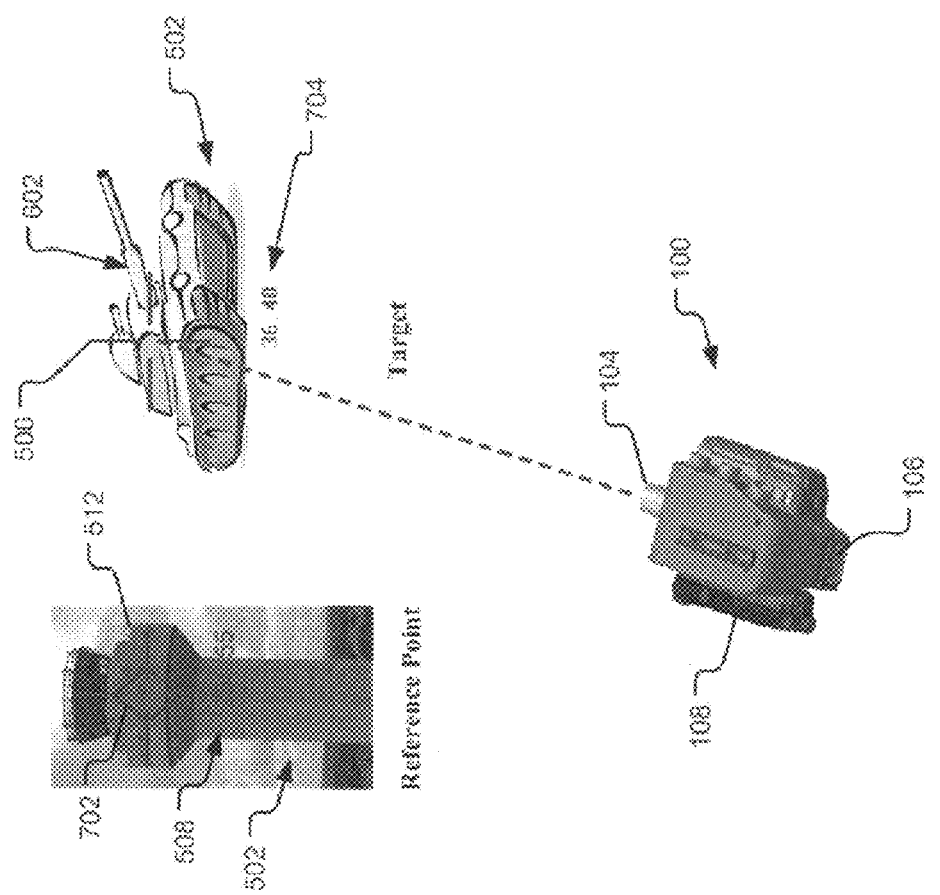
Figure 8:
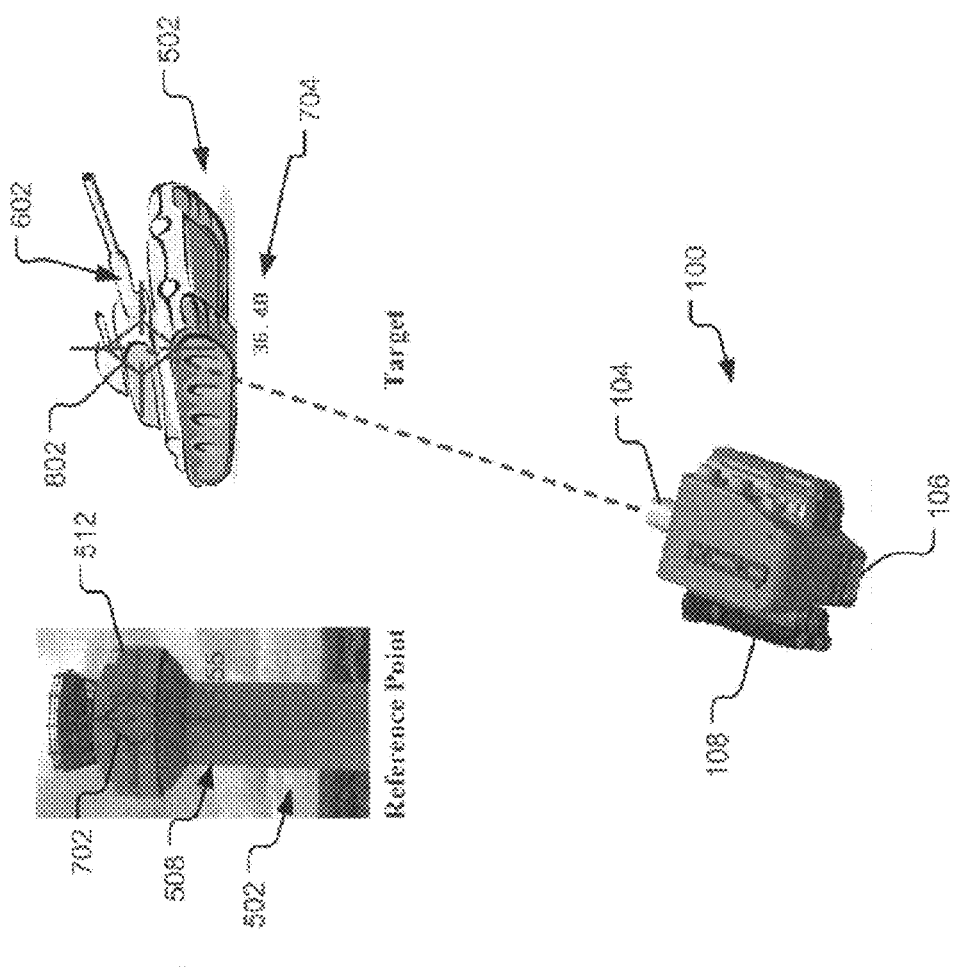
Figure 9:
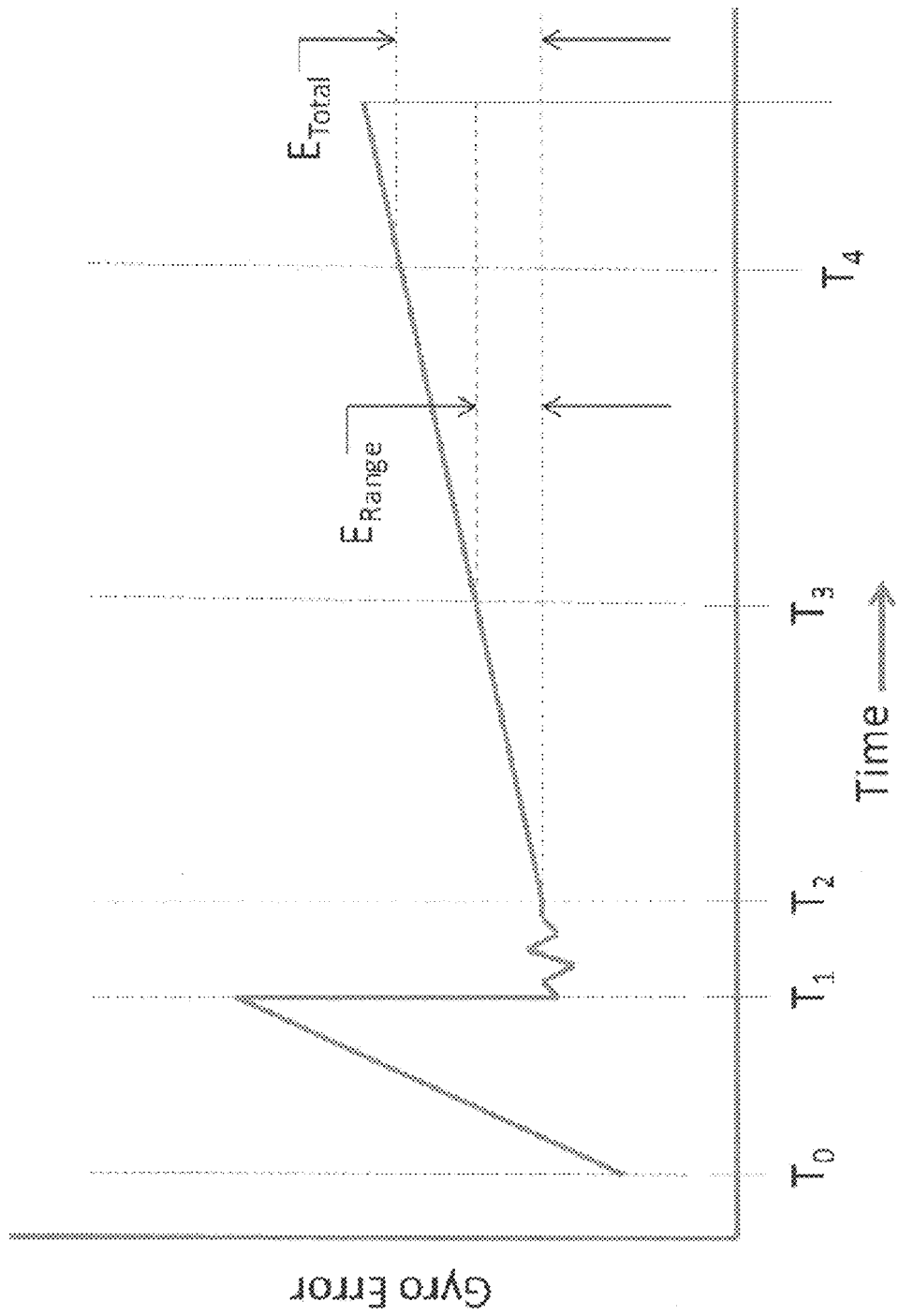
FIG. 9 includes a simulated plot of gyroscope error vs. time for a location device consistent with the present disclosure.

Applicants have discovered that the drift caused by a gyro can generally be assumed to be linear over time. FIG. 9 shows a simulated plot of normalized error of the gyroscopes 408, 410 of the IMU 318 vs. time for a location device 100 consistent with the present disclosure and FIGS. 6-8 schematically illustrate operation of a location device 100 consistent with the present disclosure. The device 100 may be turned on at time $T_0$ and the time period from $T_0$ to T, the error in the gyro may steadily increase at a first unknown slope. Although reference is made to a single gyro, two or more gyros may be used each for pitch, roll, and yaw. The device may utilize both low precision gyro(s) 410 which may be cheaper and handle higher angle rates (degrees/second) and high precision gyro(s) 408 which may be more expensive, but handle slower angle rates. This use of high and low precision gyro(s) may be used to achieve greater dynamic range.

From time $T_1$-$T_2$, the device 100 may compare the video output and the gyro(s) 408/410 output. The device 100 may compare the amount of movement perceived by the camera 320 with the amount of movement perceived by the gyro(s) 408/410. A video processor 322 (see FIG. 3) may observe a feature(s) on a down-range object through the video camera 320 and determine how many pixels the feature moved in the X and Y directions and compare that to the amount of motion the gyro(s) perceived in the X and Y directions. For example, if the device 100 is held steady, for example on a tripod, the feature(s) on the down-range object would not move in the video output and therefore any change in the gyro(s) 408/410 output is a result of gyro drift and can be subtracted out by a system controller 302. If the device 100 is handheld, any hand jitter would result in the down-range object moving in the video output resulting in a change in the video output. The system controller 302 would estimate how much of the change in the gyro(s) 408/410 output change is a result of drift and not because of actual movement of the device 100. The result would be a second, estimated error slope, which would be less than the first slope. An operator may now begin a referencing event.

At time $T_2$ the operator may point the device 100 at a reference point and press and hold a "fire" button to enable image stabilization. The "fire" button may be used to cause the range finder to fire, but it may be used to signal the system controller 302 to initiate another function or command. For ease of explanation, the discussion that follows will refer to the reference point as being the "FAA Tower," reference point 512. It is to be understood, however, that any reference point may be selected, for example from the list of known reference points 504 shown in display 106 (see FIG. 5). Although referred to as "FAA Tower," in this example, it is the actual location of a particular corner of a particular window on the FAA Tower. The location of the device 100 itself may be determined using a GPS device, either internal to the device 100 or external. Since the location of the device 100 and the reference point 512 are known, a heading is established. Once the image is stabilized, the operator can steer a cursor 506 with hand motion on to the reference point 512. Once the cursor is properly aligned with the reference point 512, the operator can release the "fire" button and the device 100 can determine true North based on the current output of the gyro(s) and the established heading. The device 100 may store a "snap shot" of the reference point 512 in memory 330. Because the video image is stabilized, the system controller 302 may have to correct for the fact that the optical axis of the video camera 320 was not pointed at the reference point 512. The system controller 302 may be able to determine the angular offset of an imaginary line between the cursor 506 and the reference point 512 and the optical axis of the video camera 320 by counting the number of pixels the image was shifted, and correct for it. The device 100 may mark the video output with a marker overlay 702 and display a first heading 508 of the reference point 512.

The operator may now acquire the location of a target 602 at time $T_3$ by panning the device 100 until the target 602 is in the view finder of the video camera 320 and then press the "fire" button to turn on the image stabilization. Once the image is stabilized, the operator can steer the cursor 506 with hand motion on to the target 602 and release the "fire" button. The system controller 302 can then determine a heading for the target 602. The device 100 may store a "snap shot" of the target 602 in the memory 330. The device 100 may mark the video output with a marker overlay 802 and display the heading 704 of the target 602. When the "fire" button is released, the image is no longer stabilized and the user can then range to the target 602 by panning the device 100 until the cursor 506 is near enough to the target 602 that the "snap shot" of the target 602 stored in the memory is recognized. The system controller 302 may use image recognition software to help determine that the device 100 is aligned with the target 602. At this time, the system controller 302 may automatically fire the range finder. Once the range is determined, a first estimate of the location of the target 602 can be determined using the location of the device 100, the change in output of the gyro(s) 408/410 from the reference point 512 to the target 602, and the distance to the target 602.

Since the gyro(s) 408/410 drift over time, the first estimated location of the target 602 may be inaccurate. To increase the accuracy, the operator may pan the device 100 back towards the reference point 512 until the cursor 506 is near enough to the reference point 506 that the "snap shot" of the reference point 512 stored in memory is recognized. At this time ($T_4$) the system controller 302 can acquire a second set of gyro(s) output(s) for the reference point 512 and compare it to the first set of gyro(s) output(s). Since the gyro(s) output(s) when the device 100 is aligned with the reference point at $T_2$ and $T_4$ should be the same, most of the error $E_{Total}$ is the result of gyro(s) 408/410 drift. If the system controller 302 assumes that the drift from $T_2$ to $T_4$ is linear, the system controller 302 can calculate the error $E_{Range}$ at time $T_3$ based on similar triangles or other mathematical methods and subtract out the error $E_{Range}$ from the total error $E_{Total}$ to obtain a second and more accurate location for the target 602. As the operator is panning the device 100 towards the reference point 512, the marker overlay 702 may not be overlaid on the reference point 512 because of gyro(s) 408/410 drift, but once the system controller 302 recognizes the reference point "snap shot," the system controller 302 can move the marker overlay 702 on top of the reference point 512.

At this time, the operator can acquire other targets, with a return to the reference point 512 increasing the accuracy of the newer targets.

Figure 10:
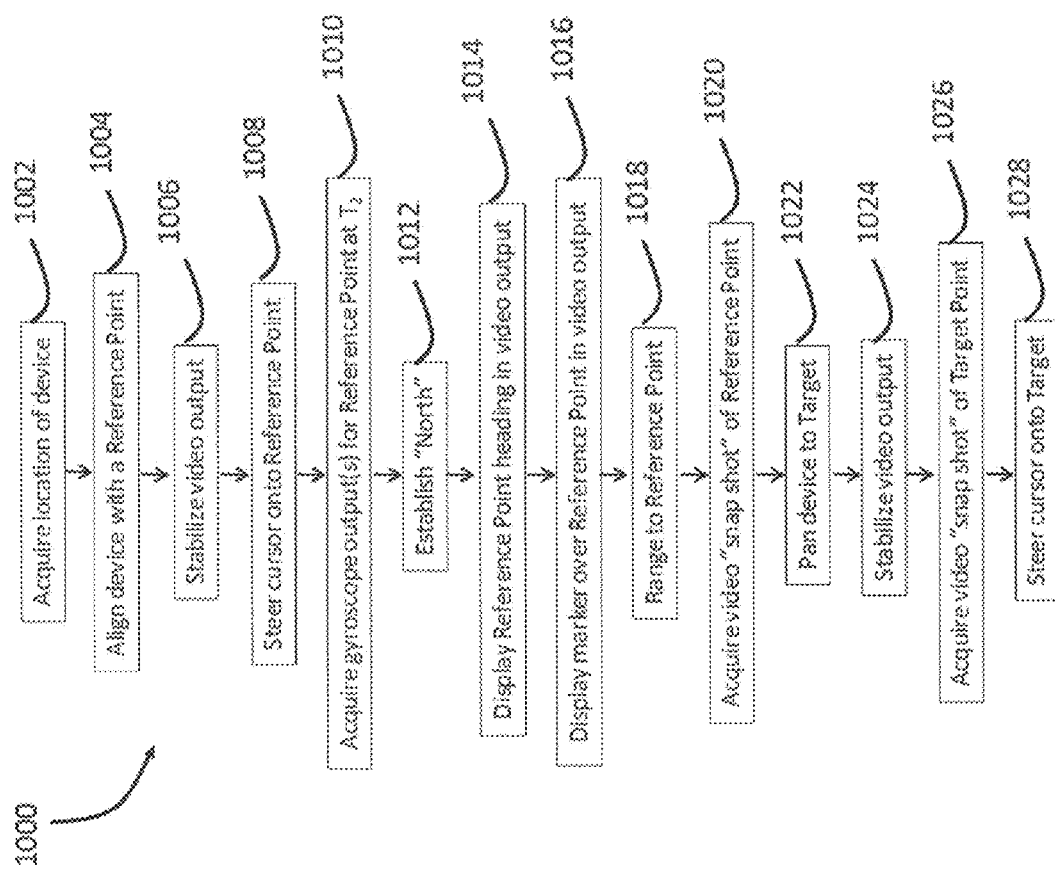
FIG. 10 is a block flow diagram of one method consistent with the present disclosure.
Figure 10:
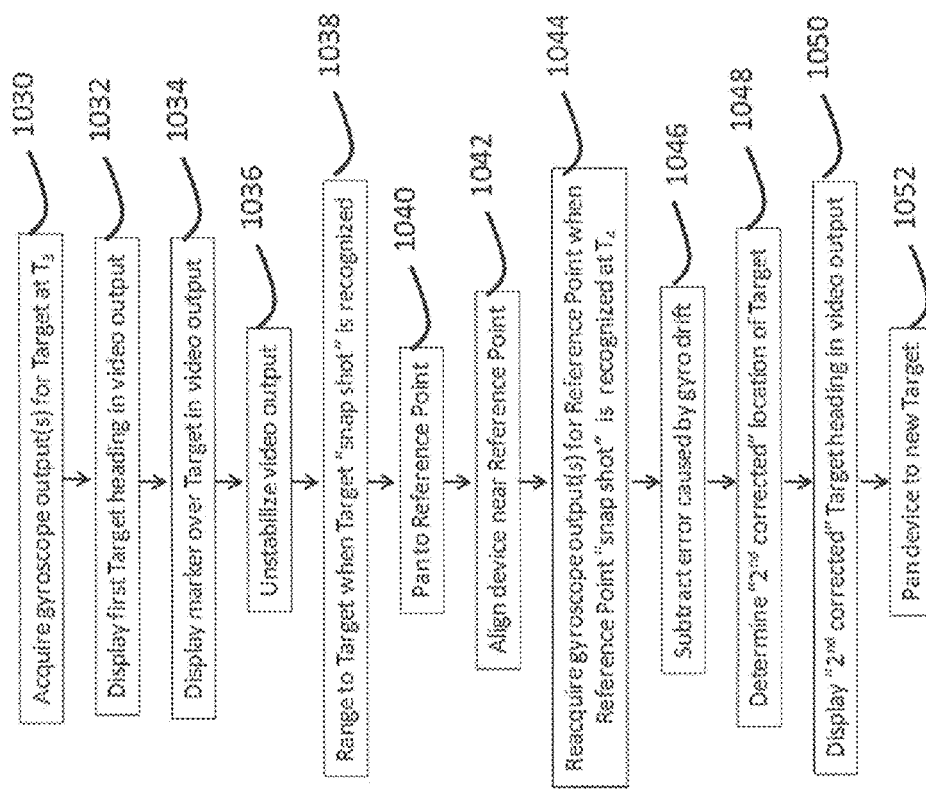

FIG. 10 is a block flow diagram of one method 1000 of determining the location of a target in a target location device including a gyroscope. The block flow diagrams illustrated herein may be shown and described as including a particular sequence of steps. It is to be understood, however, that the sequence of steps merely provides an example of how the general functionality described herein can be implemented. The steps do not have to be executed in the order presented unless otherwise indicated and some steps may be eliminated.

In the exemplary embodiment illustrated in FIG. 10, the device 100 may acquire the location of the device itself at step 1002 using a variety of known methods, including, but not limited to the use of an internal or external global positioning system (GPS). An operator may align the device 100 with a known reference point 512 at step 1004. A reference point may be man-made objects like buildings or antenna, a geographic feature such as a mountain peak, or the location of the sun, moon, a planet, a star or other celestial object. The device 100 may eliminate hand jitter by stabilizing the video output at step 1006 which will allow the operator to more accurately align the device 100 at distant reference points and targets. Once the video output is stabilized, the operator can steer the cursor 506 onto the reference point 512 at step 1008 with small hand movements. The device 100 may then acquire outputs from each of the gyros at step 1010. Since the location of the device 100 and the reference point are known, a heading is established and the device 100 may associate the outputs of the gyros with the heading, from which the device 100 can determine the gyro outputs for true "North" at step 1012. The device 100 may display the reference point 512 heading 508 in the video output at step 1014. The device 100 may display a reference point marker 702, for example a diamond, at step 1016. The device 100 may also range to the reference point 512 at step 1018. If the device 100 receives range to target information inconsistent with the reference point, the device 100 may signal the operator. The device 100 may take a photo "snap shot" of the reference point 512 at step 1020 for later use. The operator may now pan the device 100 towards the target 602 they wish to acquire the location of at step 1022. The operator may signal the device 100 to stabilize the video output at step 1024 using one of the user controls 308 and the device 100 may take a "snap shot" of the target 602 at step 1026. The operator may then steer the cursor 506 onto the target 602 with small hand movements at step 1028. The device 100 may acquire the outputs from the gyros at step 1030 and calculate a heading to the target based on the change in output of the gyros. The device 100 may display a first target heading 704 in the video output at step 1032 and display a target marker 802 over the target 602 in the video output at step 1034. The device 100 may unstabilize the video output at step 1036 at which time the range finder is again aligned with the cursor 506 and the device may then automatically range to the target 602 at step 1038 when the device 100 is aligned with the target enough that the "snap shot" of the target is recognized. The accuracy of this first estimate of the location of the target may be improved be returning to the reference point and re-zeroing the gyros. The operator may pan the device 100 back towards the reference point at step 1040 and when the device 100 is looking near the reference point 512 at step 1042 the device 100 may reacquire the gyro outputs for the reference point 512 at step 1044 when the reference point "snap shot" is recognized. The device 100 may be able to determine the angular offset between where the cursor 506 is pointed and the reference point as stored in the "snap shot" by counting the number of pixels the image needs to be shifted, and correcting for it. The device 100 may then calculate the change in output of the gyros from time $T_2$ and $T_4$ (which is mostly caused by gyro drift) and based on time determine the amount of error at time $T_3$ and subtract it at step 1046 to determine a second and more accurate location for the target 602 at step 1048. The device 100 may then display the updated heading for the target 602 in the video output at step 1050. The operator may now pan to a new target at step 1052.

Figure 11:
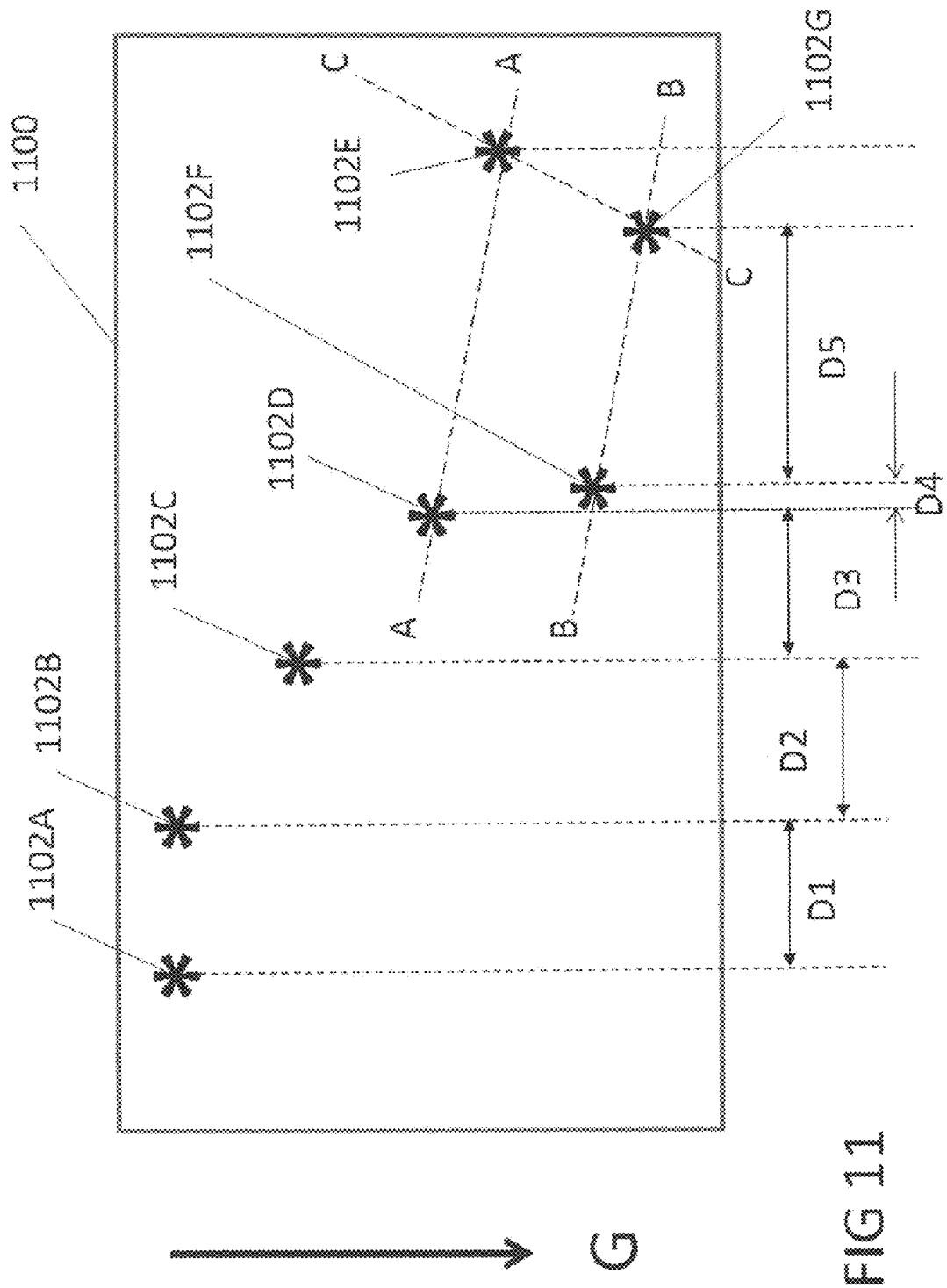
FIG. 11 is a graphical illustration of a constellation viewed through the location device consistent with the present disclosure.

In the location device 100, the location of a target is determined primarily based on the change in pitch (elevation/lateral) and yaw (azimuth/vertical) from a reference point, and to a minor extent a change in roll (longitudinal). The device 100 may determine roll using one of the axes of one of the gyros. Since the three axes are orthogonal to each other, any error in the roll will cause error in the other two axes. With celestial reference points, the device 100 may compare observed features (e.g. centroid or edges) to known features to correct for error in roll. FIG. 11 shows a constellation 1100 (e.g. Big Dipper) in the device 100's field of view. The constellation 1100 may consist of numerous stars (1102A-G) whose locations are well known for every day and time of the year. Other constellations or collections of stars may be used as well. The device 100 may use information from the gyros and the location of the device 100 itself to more quickly locate the constellation 1100 by only looking for stars that should be in the field of view of the device 100 and ignoring the remainder of the star catalog/registry. The device may use a variety of algorithms to locate the constellation with algorithm having tradeoffs in time to locate and accuracy. For example, the device 100 may calculate the spacing between the stars 1102A-G and then compare it to a star catalog/registry to find a constellation or other collection of stars that have the ratio of spacing between a series of stars. For example, the device 100 may calculate a distance D1 between stars 1102A and 1102B, a distance D2 between stars 1102B and 1102C, a distance D3 between stars 1102C and 1102D, etc. and then compare the distance to what is expected based on the star catalog/registry. If the device 100 has a roll component other than vertical, all the distances will be off from what is expected. The device 100 can then determine true vertical by "rotating" the constellation in memory using an algorithm until the spacing is appropriate. Alternatively, the device 100 may compare the slope of a line A-A between two stars 1102D and 1102E or the angle between two line A-A and B-B and compare it to the expected slope or angle and then correct the rezero the roll gyro. Alternatively, the device 100 can "capture" an image of the constellation (or a portion thereof) in memory and then compare it to the expected orientation of the constellation based on the star catalog/registry and then rotate the constellation in memory until the stars align and then rezero the roll gyro.

FIG. 12 shows the moon 1200 in one of its phases in the device 100's field of view. The location and shape of the moon is well known based on time of day/year. The location device 100 may "capture" an image of the moon and compare the illuminated portion to the expected illuminated portion and then rezero the roll gyro.

According to one aspect of the disclosure there is provided a target location device 100 including: a video camera; a display for providing a video output of the camera and a cursor overlayed on the video output for aiming the camera on a reference point or on a target in the video output by positioning the cursor on the reference point or the target; a range finder for determining a target distance from the device to the target when the camera is aimed at the target; a self location module configured to determine a geographic location of the device; and an inertial measurement unit including at least one gyroscope for providing a first output corresponding to a position of the reference point when the camera is aimed at the reference point and a second output corresponding to a position of the target when the camera is aimed at the target.

According to another aspect of the disclosure there is provided a method of determining the location of a target in a target location device including a gyroscope. The method includes: acquiring a reference point gyroscope output corresponding to a position of a reference point; acquiring a target gyroscope output corresponding to a position of the target; acquiring an updated reference point gyroscope output corresponding to the position of the reference point; calculating a gyroscope error in response to the reference point gyroscope output and the updated reference point gyroscope output; and calculating a geographic position of the target in response to the gyroscope error.

According to another aspect of the disclosure there is provided a method of determining the location of a target in a target location device. The method includes: determining a geographic location of the target location device; displaying a video output of a video camera on a display with an overlay, the overlay including a cursor for aiming the camera on a reference point or on the target; acquiring a first gyroscope output corresponding to a position of said reference point when said camera is aimed at said reference point; acquiring a second gyroscope output corresponding to a position of said target when said camera is aimed at said target; firing a range finder to determine a target distance from said device to the target when the camera is aimed at the target; and calculating the location of the target in response to the geographic location of the device, the first gyroscope output, the target distance and the second gyroscope output.

Embodiments of the methods described herein may be implemented using a processor and/or other programmable device 100, such as the system controller 302. To that end, the methods described herein may be implemented on a tangible, non-transitory computer readable medium having instructions stored thereon that when executed by one or more processors perform the methods. Thus, for example, the system controller 302 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk rewritables (CD-RWs), and magneto-optical disks, semiconductor device 100*s* such as read-only memories (ROMs), random access memories (RAMs) such as dynamic and static RAMs, erasable programmable read-only memories (EPROMs), electrically erasable programmable read-only memories (EE-PROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processor" or "controller", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, components illustrated in FIGS. 3 and 4 may comprise one or more integrated circuits. An "integrated circuit" may be a digital, analog or mixed-signal semiconductor device 100 and/or microelectronic device 100, such as, for example, but not limited to, a semiconductor integrated circuit chip.

The term "coupled" as used herein refers to any connection, coupling, link or the like by which signals carried by one system element are imparted to the "coupled" element. Such "coupled" device 100s, or signals and device 100s, are not necessarily directly connected to one another and may be separated by intermediate components or device 100s that may manipulate or modify such signals.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A target location device comprising:
    a video camera;
    a display for providing a video output of said camera and a cursor overlayed on said video output for aiming said video camera on a reference point or on a target in said video output by positioning said cursor on said reference point or said target;
    a range finder for determining a target distance from said device to said target when said video camera is aimed at said target;
    a self location module configured to determine a geographic location of said device; and
    an inertial measurement unit comprising at least one gyroscope for providing a first output corresponding to a position of said reference point when said video camera is aimed at said reference point and a second output corresponding to a position of said target when said video camera is aimed at said target,
    wherein said device is configured to correct for errors in said at least one gyroscope in response to a third output of said gyroscope corresponding to a position of said reference point, said third output being provided after said second output.

2. A device according to claim 1, said device further comprising at least one video processor for providing stabilization of said video output to facilitate said positioning of said cursor on said reference point and on said target.

3. A device according to claim 1, wherein said device is configured for automatically firing said range finder for determining said target distance when said video camera is aimed at said target.

4. A device according to claim 1, wherein said reference point has a known geographic location stored in a memory of said device.

5. A device according to claim 1, wherein said display further comprises a list of known reference points overlayed on said video output, each of said known reference points having a known geographic location stored in a memory of said device, and wherein said device comprises a user control for selecting one of said known reference points as said reference point.

6. A device according to claim 1, wherein said device is configured to mark said reference point with a reference point marker, said reference point marker being overlayed on said reference point.

7. A device according to claim 6, wherein said device is configured for automatically calculating an updated gyroscope output corresponding to a position of said reference point when said cursor is placed on said reference point marker.

8. A device according to claim 6, wherein said device is configured for automatically firing said range finder for determining said reference point distance from said device to said reference point when said cursor is placed on said reference point marker.

9. A device according to claim 1, wherein said device is configured to mark said target with a target marker, said target marker being overlayed on said target.

10. A device according to claim 9, wherein said device is configured for automatically calculating an updated gyroscope output corresponding to a position of said target when said cursor is placed on said target marker.

11. A device according to claim 9, wherein said device is configured for automatically firing said range finder for determining said target distance from said device to said target when said cursor is placed on said target marker.

12. A method of determining the location of a target in a target location device comprising a gyroscope, said method comprising:
    acquiring, by a processor, a reference point gyroscope output corresponding to a position of a reference point;
    acquiring, by a processor, a target gyroscope output corresponding to a position of said target;
    acquiring, by a processor, an updated reference point gyroscope output corresponding to said position of said reference point;
    calculating, by a processor, a gyroscope error in response to said reference point gyroscope output and said updated reference point gyroscope output; and
    calculating, by a processor, a geographic position of said target in response to said gyroscope error.

13. A method according to claim 12, said method further comprising:
    displaying a video output of a video camera on a display with an overlay; said overlay comprising a cursor for aiming said video camera on said reference point or on said target in said video output by positioning said cursor on said reference point or said target; and
    marking said reference point with a reference point marker overlayed on said video output, wherein said device automatically acquires said updated reference point gyroscope output when said cursor is positioned adjacent said reference point marker.

14. A method according to claim 13, further comprising stabilizing said video output to facilitate positioning of said cursor on said reference point or said target.

15. A method of determining a geographic position of a target in a target location device, said method comprising:
    determining a geographic location of said device from an output of a global positioning system device;
    displaying a video output of a video camera on a display with an overlay, said overlay comprising a cursor for aiming said video camera on a reference point or on said target in said video output;
    acquiring a first gyroscope output corresponding to a position of said reference point when said video camera is aimed at said reference point;

acquiring a second gyroscope output corresponding to a position of said target when said video camera is aimed at said target;

firing a range finder to determine a target distance from said device to said target when said video camera is aimed at said target;

calculating the geographic position of said target in response to said geographic location of said device, said first gyroscope output, said target distance, and said second gyroscope output;

acquiring an updated reference point gyroscope output corresponding to said position of said reference point; and calculating a gyroscope error in response to said reference point gyroscope output and said updated reference point gyroscope output, wherein said geographic position of said target is calculated in response to said gyroscope error.

16. A method according to claim 15, said method further comprising stabilizing said video output to facilitate said positioning said cursor on said reference point or on said target.

17. A method according to claim 15, wherein said firing said range finder to determine said target distance is performed automatically.

18. A method according to claim 15, further comprising displaying a heading of the target in the video output of the video camera.

* * * * *